US009325720B2

(12) United States Patent
Faccin et al.

(10) Patent No.: US 9,325,720 B2
(45) Date of Patent: Apr. 26, 2016

(54) SYSTEM AND METHOD OF CONTROLLING APPLICATION LEVEL ACCESS OF SUBSCRIBER TO A NETWORK

(75) Inventors: Stefano Faccin, Dallas, TX (US); Rene Purnadi, Coppell, TX (US); Tony Hulkkonen, Helsinki (FI); Jaakko Rajaniemi, Helsinki (FI); Markku Tuohino, Espoo (FI); Mohan Sivanandan, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 352 days.

(21) Appl. No.: 13/430,779

(22) Filed: Mar. 27, 2012

(65) Prior Publication Data

US 2012/0184271 A1    Jul. 19, 2012

Related U.S. Application Data

(60) Division of application No. 09/731,758, filed on Dec. 8, 2000, which is a continuation-in-part of application No. 09/580,425, filed on May 30, 2000, now Pat. No. 6,725,036.

(51) Int. Cl.
| | |
|---|---|
| *H04W 8/00* | (2009.01) |
| *H04W 8/02* | (2009.01) |
| *H04W 8/08* | (2009.01) |
| *H04W 8/18* | (2009.01) |
| *H04L 29/06* | (2006.01) |
| *H04L 29/08* | (2006.01) |

(52) U.S. Cl.
CPC .............. *H04L 63/104* (2013.01); *H04L 67/04* (2013.01); *H04L 67/306* (2013.01); *H04L 69/329* (2013.01); *H04W 8/00* (2013.01); *H04W 8/02* (2013.01); *H04W 8/08* (2013.01); *H04W 8/18* (2013.01)

(58) Field of Classification Search
CPC ........... H04W 8/00; H04W 8/02; H04W 8/08; H04W 8/18; H04L 63/104; H04L 67/306; H04L 67/04; H04L 69/329
See application file for complete search history.

(56) References Cited

U.S. PATENT DOCUMENTS

| 5,276,444 | A | | 1/1994 | McNair |
| 5,537,467 | A | | 7/1996 | Cheng et al. ............. 379/211.02 |
| 5,564,068 | A | | 10/1996 | Nguyen ....................... 455/433 |
| 5,684,950 | A | | 11/1997 | Dare et al. |
| 5,742,668 | A | | 4/1998 | Pepe et al. |
| 5,812,950 | A | * | 9/1998 | Tom .............................. 455/440 |
| 5,857,153 | A | | 1/1999 | Lupien |
| 5,862,481 | A | * | 1/1999 | Kulkarni ............... H04W 88/16 455/432.2 |

(Continued)

FOREIGN PATENT DOCUMENTS

WO    WO-00/29923-    5/2000

*Primary Examiner* — Patrice Winder
*Assistant Examiner* — Angela Widhalm De Rodrig
(74) *Attorney, Agent, or Firm* — Harrington & Smith

(57) ABSTRACT

The invention is a system and method of controlling an access of a subscriber to a network. The method includes sending an identification of the subscriber and a level of access to be provided to the subscriber from a visited network of a plurality of networks (12, 14, 16) connected to a home network (10); in response to the identification of the subscriber and a level of access to be provided to the subscriber, storing a subscriber profile of the authorized of access to be provided to the subscriber; and controlling access of the subscriber to any network dependent upon a comparison of access to be provided to the subscriber and the stored subscriber profile.

14 Claims, 7 Drawing Sheets

(56) References Cited

U.S. PATENT DOCUMENTS

| | | | |
|---|---|---|---|
| 5,943,619 A | 8/1999 | Coyne et al. ................... 455/433 |
| 5,944,824 A | 8/1999 | He | |
| 5,999,611 A * | 12/1999 | Tatchell et al. .......... 379/211.02 |
| 6,064,666 A | 5/2000 | Willner et al. | |
| 6,067,456 A | 5/2000 | Duran ........................... 455/461 |
| 6,073,015 A | 6/2000 | Berggren et al. .......... 455/432.2 |
| 6,081,715 A | 6/2000 | La Porta et al. ............... 455/445 |
| 6,097,942 A | 8/2000 | Laiho | |
| 6,115,754 A * | 9/2000 | Landgren ..................... 709/249 |
| 6,134,446 A | 10/2000 | Sasuta et al. | |
| 6,148,199 A | 11/2000 | Hoffman et al. ............. 455/433 |
| 6,167,280 A | 12/2000 | Barrett et al. ................ 455/468 |
| 6,256,497 B1 | 7/2001 | Chambers | |
| 6,359,880 B1 | 3/2002 | Curry et al. | |
| 6,363,411 B1 | 3/2002 | Dugan et al. | |
| 6,393,482 B1 | 5/2002 | Rai et al. ...................... 709/225 |
| 6,421,714 B1 | 7/2002 | Rai et al. ...................... 709/217 |
| 6,430,276 B1 | 8/2002 | Bouvier et al. | |
| 6,445,911 B1 | 9/2002 | Chow et al. | |
| 6,473,407 B1 * | 10/2002 | Ditmer et al. ................ 370/252 |
| 6,502,193 B1 | 12/2002 | Barber ............................. 726/4 |
| 6,535,741 B1 | 3/2003 | Aschir et al. ................. 455/445 |
| 6,611,685 B1 | 8/2003 | Rune et al. .................... 455/433 |
| 6,614,774 B1 | 9/2003 | Wang | |
| 6,665,718 B1 * | 12/2003 | Chuah et al. .................. 709/225 |
| 6,675,208 B1 | 1/2004 | Rai et al. ....................... 709/224 |
| 6,697,806 B1 | 2/2004 | Cook ............................... 707/10 |
| 6,745,029 B2 | 6/2004 | Lahtinen et al. ........... 455/432.1 |
| 6,754,482 B1 * | 6/2004 | Torabi ........................... 455/410 |
| 6,763,344 B1 | 7/2004 | Osentoski et al. ................ 707/1 |
| 6,769,000 B1 | 7/2004 | Akhtar et al. | |
| 6,789,110 B1 * | 9/2004 | Short ...................... H04L 12/14 709/221 |
| 6,931,402 B1 | 8/2005 | Pereira, III ....................... 707/9 |
| 6,947,432 B2 | 9/2005 | Roy ............................... 370/401 |
| 7,092,696 B1 * | 8/2006 | Hosain et al. ................. 455/405 |
| 7,162,540 B2 * | 1/2007 | Jasen et al. .................... 709/242 |
| 7,200,385 B1 * | 4/2007 | Wallenius ............... H04W 8/22 455/414.1 |
| 2001/0031635 A1 | 10/2001 | Bharatia ....................... 455/432 |
| 2001/0031636 A1 * | 10/2001 | Hanson ................. H04M 15/00 455/432.1 |
| 2002/0012351 A1 | 1/2002 | Sofer et al. .................... 370/401 |
| 2002/0052754 A1 * | 5/2002 | Joyce et al. ....................... 705/1 |
| 2003/0063072 A1 * | 4/2003 | Brandenberg et al. ........ 345/173 |
| 2003/0114149 A1 | 6/2003 | Lehtonen et al. ............. 455/418 |

\* cited by examiner

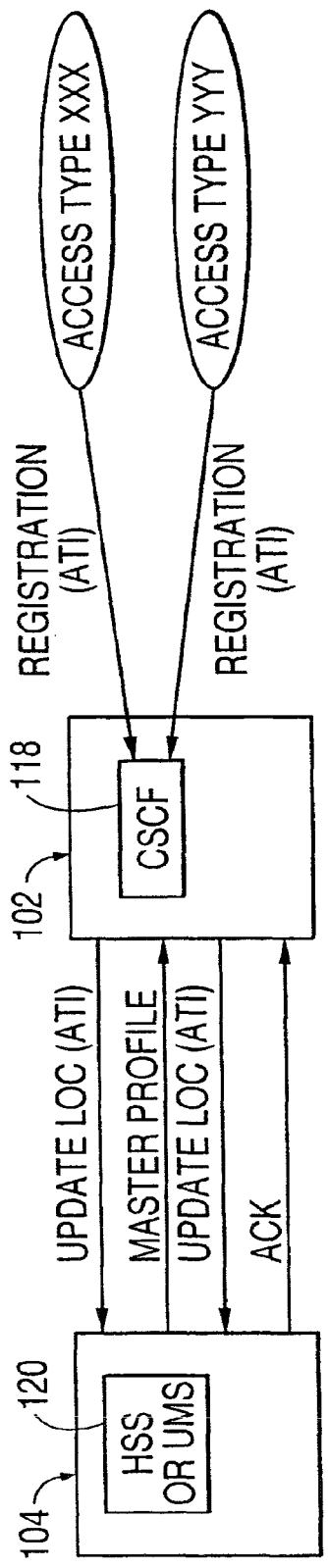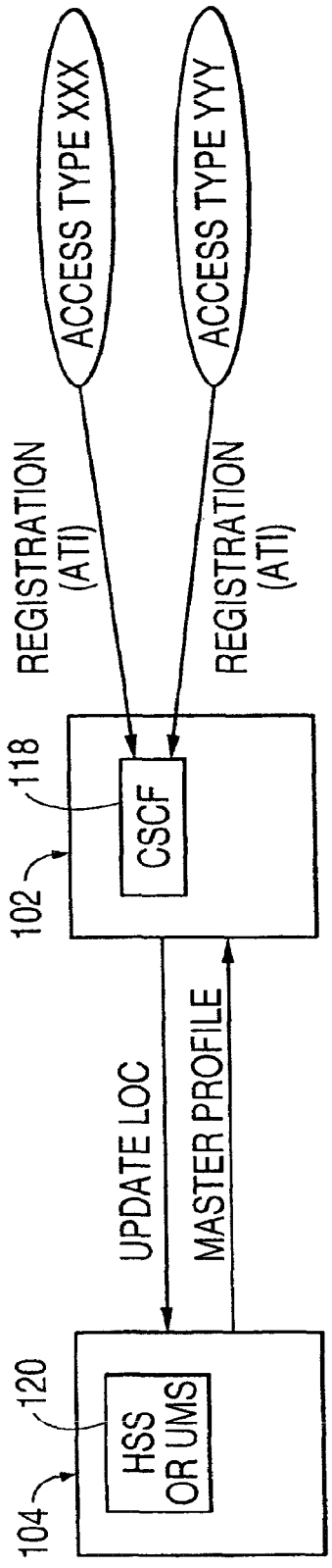

SYSTEM AND METHOD OF CONTROLLING APPLICATION LEVEL ACCESS OF SUBSCRIBER TO A NETWORK

CROSS REFERENCE TO RELATED APPLICATION

This application is a divisional application of U.S. patent application Ser. No. 09/731,758, filed Dec. 8, 2000, published as U.S. Patent Publication Number 2001/0049790 A1, which is a Continuation-In-Part of U.S. patent application Ser. No. 09/580,425, filed May 30, 2000, entitled "System and Method of Controlling Application Level Access of a Subscriber to a Network", now issued as U.S. Pat. No. 6,725,036, the disclosures of which are incorporated herein by reference in their entirety.

BACKGROUND OF THE INVENTION

The present invention relates to a system and method for controlling level or type of access of a subscriber to a network.

DESCRIPTION OF THE PRIOR ART

Access to a home network, through a visited network, has been limited to a single level of access. As a result, subscriber equipment has not been portable across multiple visited networks which are connected to a home network in view of their functionality being limited to a single level or type of access. In essence, each visited network through which a subscriber obtains access to a home network is limited to a single subscriber profile and does not provide for multiple subscriber profiles to facilitate different types of connectivity of a subscriber through a visited network to a home network.

Also seamless roaming, whether under the control of a home network or a visited network between different types of access networks, is an essential requirement in future mobile and fixed networks. While roaming between different types of access technologies, the entity providing voice over Internet protocol/internet protocol (VoIP/IP) multimedia services may remain in the same network regardless of whether the network providing the multimedia services is a home or visited network. Examples of such entities VoIP/IP multimedia networks are, e.g. Call State Control function (CSCF), Gate Keeper, SIP Server.

Different types of access networks have their own characteristics, such as quality of service (QoS) (max bandwidth, delay, etc) and there also may be differences between the set of available services. Access networks may have divergent behavior (e.g. location based services).

Another problem is that the entity where the subscriber subscription information is located in the network (e.g. User Mobility Server) (UMS) in 3GPP ROO, has to know the access network type to be able to screen terminating communications to the subscriber if the currently used access network does not support that particular service or requested minimum QoS.

SUMMARY OF THE INVENTION

The present invention is a system and method of controlling access of a subscriber to any network. The access may be application level access. During application level registration, an application level message is sent from subscriber equipment connected to a home network or visited network which is one of a plurality of visited networks connected to the home network. The visited network may be one of a plurality of visited networks directly connected to the home network or may be one of a plurality of access networks which are connected to the home network through a visited network. The application level message includes a subscriber identity and level of access to any network which may be the home network, any one of the plurality of networks or another network to which the subscriber may be connected. The level of access may be in the form of an access mode ID comprised of a plurality of bits which uniquely identify one of a plurality of choices of level of access to another network which are available to any network to which the subscriber may connect subscriber equipment.

The networks directly connected to the home network in accordance with the invention are diverse in nature and without limitation may be a public cellular visited network such as a general packet radio system (GPRS), a wireline internet service provider (ISP), or a wireless local area network (LAN) such as, but without limitation, a local area network within a corporation. Regardless of the type of visited network directly connected to the home network, the application level registration message is sent from an entity in the visited network to an address of an entity in the home network which address is obtained from another network entity in the visited network. The entity in the home network receiving the application level registration message uses the received identification of the subscriber and the level or type of access to fetch from a storage in the home network a subscriber profile which is to be used to provide connectivity to the user equipment in the visited network and any network in accordance with the specified level or type of access in the application level registration message. The identification of the level or type of access contained in the application level of registration message is a pointer to the subscriber profile specifying the level or type of access and, upon fetching from the storage, is caused to be stored in a network entity either in the home network or in the visited network. The accessed subscriber profile is stored in the home network and accessed through a proxy entity in the visited network or is transmitted from the home network to the entity in the visited network from which the application level registration message was transmitted. Such entity is without limitation, a proxy server, gateway or serving call state control function (s-CSCF). The entity storing the subscriber profile in either the home network or the visited network functions to control the communications in accordance with well-known procedures for the subscriber user equipment in the visited network and the home network. If the visited network is a public cellular visited network, the entity receiving the subscriber profile for storage therein may be a s-CSCF; and if the visited network is a wireline ISP or a wireless LAN, the entity in the visited network receiving the subscriber profile may be a proxy server utilizing the session initiation protocol (SIP) or a gatekeeper in accordance with the H.323 specification. The entity in the visited network which resolves the address in the home network to which the application level registration message is addressed may be a domain name server (DNS).

Different levels or types of access may be used to provide diverse types of connectivity. The access may be an application level access. For example, the diverse types of connectivity may provide a different degree of bandwidth in communications for each different access, a different degree of secured communications for each different access, or different supported supplemental services for each different access which supplemental services may be diverse in nature, such as diverse telephony services without limitation thereof.

The networks connected to the home network through a visiting network providing services to a subscriber may be access networks such as, without limitation, a GPRS, wireless local area network (WLAN) or a DSL network. The call control entity in the controlling network needs to know at the time of registration the type of access network at which subscriber registration occurs. An access type indicator provided to the call control entity provides the requisite identification of access network. The access type indicator may be provided to the home network directly or indirectly through a visited network from subscriber equipment, an interface between the subscriber equipment and the access network or by determination of a call control entity based upon characteristics of the access network such as, without limitation, packet characteristics.

The generation of the subscriber profile and the use thereof at the home network or at a control entity may be accomplished in many ways. Without limitation, the subscriber registration at an access network may be accomplished by transmitting an access type indicator directly to or through a visited network to the home network which identifies the type of access network at which registration has occurred. The source of the access type indicator may be explicitly provided by subscriber equipment or an interface between the subscriber equipment and the access network at which the subscriber is registered or implicitly from the control entity in a visited network analyzing the notice of the communications to form the access network to the control entity. Thereafter, the home network generates or accesses the subscriber profile which may have two parts which are a general service part and a part particular to the characteristics of the access type network to which the subscriber may roam.

A method of controlling access of a subscriber to a network in accordance with the invention includes sending an identification of the subscriber and an access to be provided to the subscriber from the visited network of a plurality of networks connected to the home network to the home network; in response to the identification of the subscriber and the access to be provided to the subscriber, storing a subscriber profile of an authorized access to be provided to the subscriber; and controlling access of the subscriber to any network dependent upon a comparison of service to be provided to the subscriber and the stored subscriber profile. The access may be an application level of access. The storing of the subscriber profile may be in the home network or may be in the visited network. Each access may provide a different degree of bandwidth in communications; a different degree of security in communications for each different access; or a different supported supplementary services for each different access. The home network may be an internet protocol network and the visited network may be a wireless public cellular bearer network. The public cellular bearer network may be a general packet radio system network. The home network may be an internet protocol network and the visited network may be an internet service provider. The home network may be an internet protocol network and the visited network may be a wireless local area network. The authorized access may be chosen from a plurality of authorized accesses which may be granted to the subscriber between the plurality of connected networks and the home network. An application level registration message containing the identification of the subscriber and the access may be generated in response to a request from subscriber equipment to a visited network entity; in response to an entity in the visited network receiving the request, an address of an entity in the home network may be obtained from a routing analysis in the visited network; and the application level registration message may be transmitted to the address in the home network. An entity of the home network may obtain the subscriber profile in response to receipt of the application level registration message.

A system in accordance with the invention includes a home network which stores a plurality of subscriber profiles each defining an access to be provided to a subscriber to a network; a plurality of networks connected to the home network; subscriber equipment connected to a visited network of the plurality of networks through which the subscriber obtains an access to any network; and wherein in response to connection of the subscriber equipment to the visited network, an identification of the subscriber and an access to be provided to the subscriber is sent to the home network, and a subscriber profile of an access to be provided to the subscriber is stored in one of the networks and access of the subscriber to any network is controlled by one of the networks storing the subscriber network dependent upon a comparison of the service to be provided to the subscriber and the stored subscriber profile. A network entity within the home network or within the visited network may store the subscriber profile.

A method of controlling access of a subscriber to roam in networks in accordance with the invention includes providing an identification of the subscriber and an access of the subscriber at a home network, the access comprising an identification of access to one of the networks in which the subscriber is registered; in response to the providing of the identification of the subscriber and the access at the home network, storing a subscriber profile indicating an access to be provided to the subscriber to at least the networks; and using the stored subscriber profile in controlling service provided to the subscriber. The controlling of the service provided to the subscriber may occur while the subscriber is roaming in a visited network and the networks may be access networks from which the subscriber may obtain services while roaming in the visited network. The subscriber profile may be stored in the home network or in a visited network. The sending of the identification of the subscriber and an access may occur in response to the transmission of an access type indicator identifying a network in which the subscriber is registered through the visited network to the home network. The subscriber profile may comprise general service data used in providing service to the subscriber and data regarding permitted access of the subscriber to the networks. The access may originate from equipment of the subscriber registered in one of the networks. The access may originate from a network entity providing an interface between the visited network and one of the access networks to which the subscriber is registered. The access may be determined by a call control entity based upon information obtained by the control entity about the network to which the subscriber is registered. In response to at least one subsequent identification of the subscriber and the access being provided at the home network, the home network may send to the visited network an acknowledgment of a change in registration of the subscriber to another access network. The access may be used by the home network to control connectivity of communications to the subscriber through the home network.

A method of controlling access of a subscriber to register in networks in accordance with the invention includes providing an identification of the subscriber at a home network; in response to the providing of the identification of the subscriber, storing a subscriber profile of an access to be provided to the subscriber to at least the networks; and using the stored subscriber profile in controlling service provided to the subscriber. The controlling of the service provided to the subscriber may occur while the subscriber is registered in a visited network and the networks may be access networks from which the subscriber may obtain services while registered in the visited network. The storing of the subscriber profile may be in the home network or in the visited network. The providing of the identification of the subscriber may occur in response to transmission of an access type indicator to the home network identifying an access network in which the subscriber is registered. The access may originate from equipment of the subscriber registered to one of the networks. The access may originate from a network entity providing an interface between the visited network and one of the access networks to which the subscriber is registered. The access may be determined by a call control entity based upon information obtained by the control entity about the network to which the subscriber is registered.

A system in accordance with the invention includes a home network which stores a plurality of subscriber profiles each defining an application level of access to be provided to a subscriber while registered in networks; networks in which the subscriber may register; at least one subscriber equipment which is connected to the networks while the subscriber is registered therein; and wherein in response to connection of the subscriber equipment to one of the networks at least an identification of the subscriber is provided at the home network, a subscriber profile of an authorized access to be provided to the subscriber to at least the networks is stored, and the stored subscriber profile is used in controlling service provided to the subscriber. The controlling of the service provided to the subscriber may occur while the subscriber is registered in a visited network and the networks may be access networks from which the subscriber may obtain services while roaming in the visited network. A storage in a visited network may store the subscriber profile. An access comprising an identification of access to one of the networks in which the subscriber is registered may be transmitted from the visited network to the home network and the storing of the subscriber profile may be in response to the identification of access at the home network. The stored subscriber profile may be used by the visited network in controlling service provided to the subscriber.

BRIEF DESCRIPTION OF THE DRAWINGS

FIG. 8 illustrates a second methodology of generation and transferring of subscriber profile information with the embodiment of FIG. 6.

FIG. 9 illustrates a third methodology of generation and transferring of subscriber profile information with the embodiment of FIG. 6.

Like parts are identically identified throughout the drawings.

DESCRIPTION OF THE PREFERRED EMBODIMENTS

Figure 1:
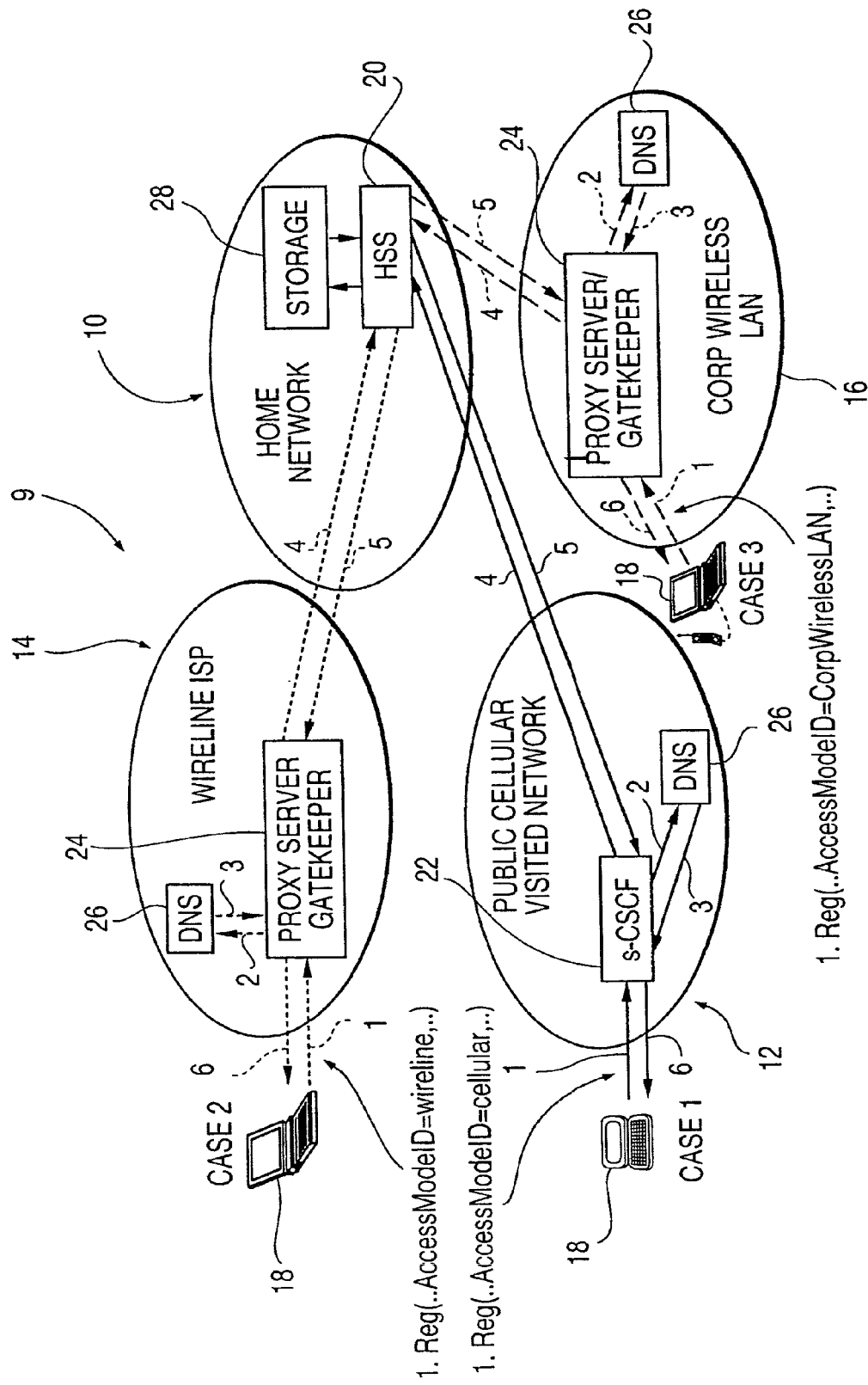
FIG. 1 illustrates a first embodiment of a plurality of networks connected to a home network in accordance with the present invention.

FIG. 1 illustrates a first embodiment 9 of a plurality of networks directly connected to a home network 10. The plurality of connected networks which, without limitation, may be as illustrated in FIG. 1 a public cellular visited network 12 such as GPRS, a wireline ISP 14 and a corporation wireless LAN 16. As illustrated, the connectivity of the particular subscriber equipment 18 is identified as "Case 1", "Case 2" and "Case 3" respectively between the public cellular visited network 12, wireline ISP 14 or corporation wireless LAN 16 and the home network 10. In each of the three cases, an application level registration message is sent from an entity, such as s-CSCF 22 or Proxy Server/Gatekeeper 24, in a visited one the plurality of networks 12, 14 and 16 connected to a home subscriber server (HSS) 20 or user mobility server (UMS) which contains the subscriber identification and the different profile for different access modes to be provided to the subscriber. The application level registration message contains an identification of the subscriber such as, but not limited to, the IMSI of the subscriber equipment 18 and the level or type of access which is encoded as a multiple bit access mode identification and is transmitted from the network entity 22 or 24 in the visited network to the HSS 20 in the home network 10. In the public cellular visited network 12, the entity transmitting the application level registration message is a s-CSCF 22 which is well known; in the wireline ISP the entity transmitting the application level registration message is a proxy server/gatekeeper 24 which are well known with the proxy server using the SIP protocol or the gatekeeper being in accordance with the H.323 specification; and in the corporate wireless LAN 16, the network entity is also a proxy server/gatekeeper 24.

Case 1 operation is explained from an overview standpoint as follows. The subscriber utilizes subscriber equipment 18 to transmit message "1" to the s-CSCF 22 to request an application level registration through the public cellular visited network 12 to the home network 10. The s-CSCF 22 transmits message "2" to a DNS 26 which resolves the address of the HSS 20 to which the application level registration message is to be sent from the s-CSCF 22. The address is returned from the DNS 26 to the s-CSCF 22 as message "3". Thereafter the s-CSCF 22 transmits message "4" to the HSS 20 which contains the subscriber identification and an identification of the application level of connectivity which is sought. The HSS 20 retrieves from a storage 28 a subscriber profile of an authorized type or level of access associated with the subscriber identified in the message received by the HSS 20. The storage 28 may be any home network entity and may be part of the HSS 20. The storage 28 stores for each of the connected networks 12, 14 and 16 or any other network, including networks other than the networks illustrated in FIG. 1 to which the subscriber may be connected to obtain telecommunications services, one of a plurality of selectable subscriber profiles defining the authorized level or type of access. Thereafter, when the home network decides that the call control will be located in the visited network in this embodiment, the network entity 20 transmits message "5" containing the subscriber profile containing the authorized level or type of access to the s-CSCF 22 for storage therein. The retrieved subscriber profile is compared by the s-CSCF with the level or type of service contained in a requested type of connection, which may be any type of telecommunications connection of the subscriber, through the visited network 12. The control of access of the subscriber in the visited network 12 is dependent upon a comparison of the level or type of service which is sought to be provided to the subscriber by an attempt to connect the subscriber through the visited network 12 and the stored subscriber profile of the authorized level or type of access.

Case 2 operates in a manner analogous to Case 1 with the communications "1"-"6" therein being of the same nature as described with respect to Case 1 with the exception that the visited network entity of the wireline ISP 14 is a proxy server/gatekeeper 24 instead of the s-CSCF 22 of the public cellular visited network 12.

Case 3 operates in a manner analogous to Case 1 with the communications "1"-"6" being of the same nature as described with respect to Case 1 with the exception that the visited network entity of the wireless LAN 16 is a proxy server/gatekeeper 24 instead of the s-CSCF 22 of the public cellular visited network 12.

The subscriber profiles of levels or types of access which are available for communications between a subscriber through subscriber equipment 18 and any connected network are diverse in nature. For example, without limitation, the subscriber profiles may each identify a different level or type of access providing a different degree of bandwidth in communications for each different access; a different degree of security in communications for each different access mode or different connection of supplementary services for each different access. For example, the use of different bandwidths for connectivity between the subscriber equipment and the visited network or the home network may be dependent upon an authorized expense of communications available to the subscriber, the functionality of the subscriber equipment or network conditions. For example, the different degrees of access for security purposes may be dependent upon the subscriber, the network or the subscriber equipment. As a result of the diversity of the types or levels of access which may be requested by or allocated to the subscriber, it is possible to provide different types of connection services to the subscriber when connecting different types of subscriber equipment 18 through different networks 12, 14 and 16 or any other connected network including networks not illustrated in FIG. 1.

Figure 2:
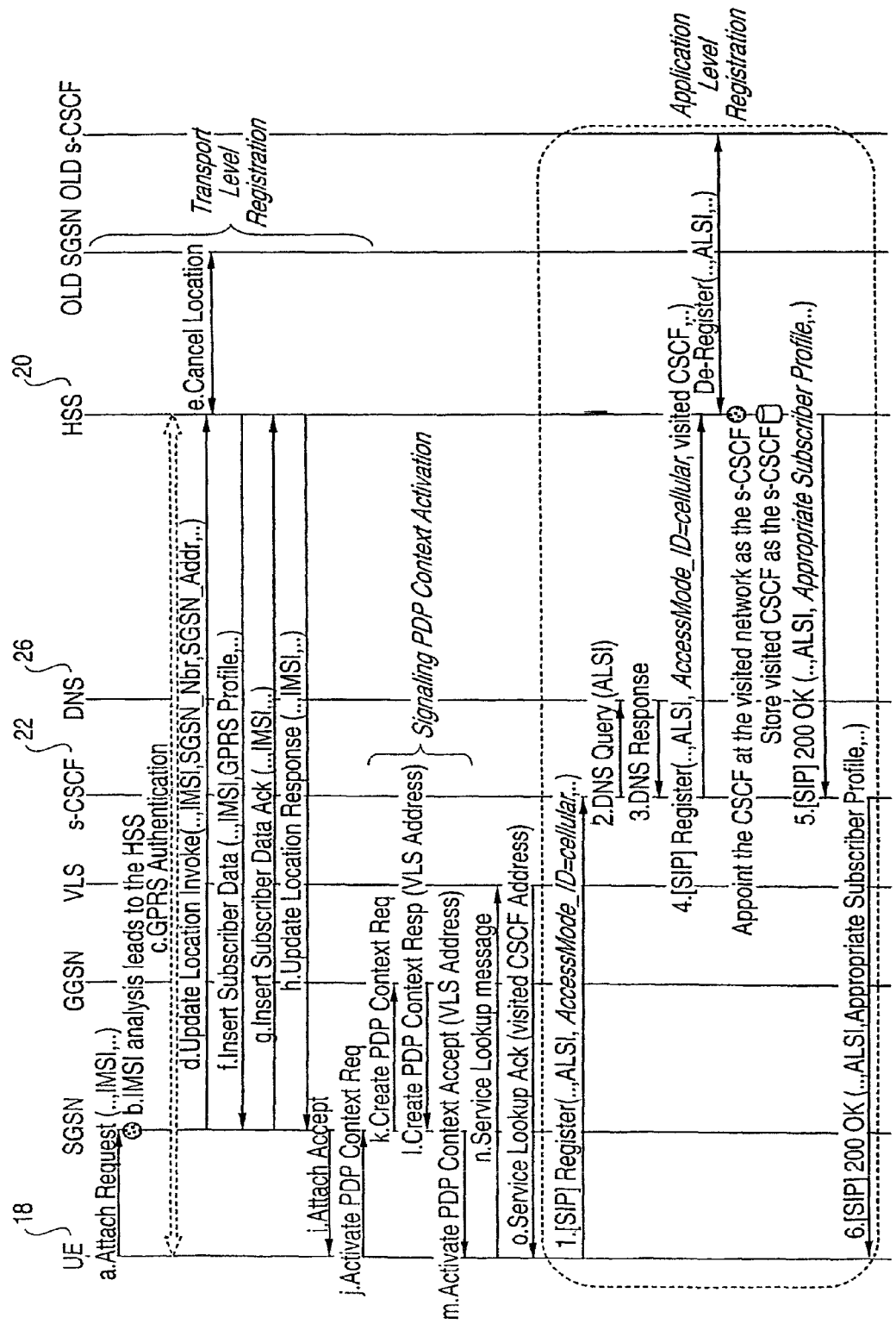
FIG. 2 illustrates a first embodiment of connectivity of a subscriber through subscriber equipment from a public cellular visited network to a home network in accordance with FIG. 1 assuming call control is at the visited network.
Figure 3:
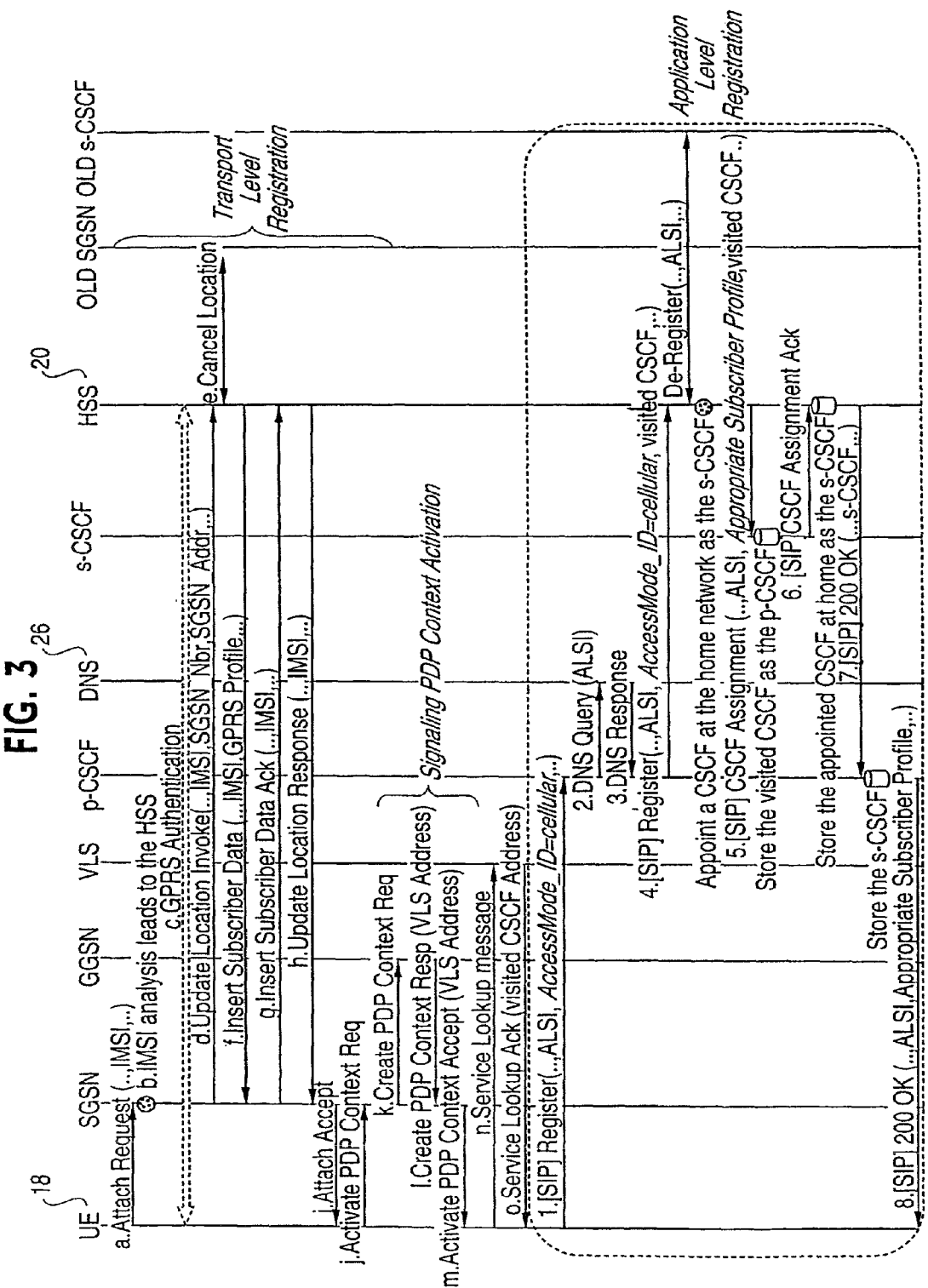
FIG. 3 illustrates a second embodiment of connectivity of a subscriber through subscriber equipment from a public cellular visited network to a home network in accordance with FIG. 1 assuming call control is at the home network.

FIGS. 2 and 3 illustrate detailed call flows for first and second embodiments of a public cellular visited network functioning as the visited network connected to the home network 10. The distinction between FIGS. 2 and 3 is that in FIG. 3 the s-CSCF, which controls the communications, resides in the home network with a p (proxy)-CSCF residing in the visited network 12 which functions as an intermediate entity in the providing of connectivity for the communications between the storage of the subscriber profiles of the levels or types of access in the s-CSCF of the home network and the visited network. In essence the p-CSCF acts as a proxy call state control function in the visited network with the call state control function being exercised by the s-CSCF in the home network 10.

With reference to FIG. 2, the transport level registration procedure and the signalling packet data protocol (PDP) context establishment are generally in accordance with the prior art procedures for public cellular networks such as GPRS and therefore are only described briefly.

The conventional communications of FIG. 2 are described as follows: The communications begin with an attached request at "a" which contains the user equipment IMSI which is transmitted from the subscriber equipment to a serving GPRS support node. Thereafter, at "b" an IMSI analysis occurs in order to obtain the address of the HSS 20 in the home network 10. The next operation "c" is a GPRS authentication as illustrated by the bidirectional communications between the UE and the HSS 20. At "d" a communication is transmitted from the SGSN to the HSS 20. The HSS 20 replies back to the SGSN at "f" with an insert subscriber data message. The SGSN replies back to the HSS with an insert subscriber data acknowledgment at "g". The HSS 20 replies with an update location response at "h". The SGSN transmits an attachment acceptance at "i" to the UE. The UE transmits an activate PDP context request at "j" to the SGSN. The SGSN creates a PDP context request at "k" which is transmitted to a gateway GPRS support node. The SGSN transmits a create PDP context response at "i". The SGSN transmits an activate PDP context acceptance to the UE at "m". The UE transmits at "o" a service lookup message to a visited CSCF location server (VLS). This sequence contains the transport level registration and signalling PDP context activation.

The application level registration involving steps "1"-"6" is in accordance with the steps 1-6 described above with reference to FIG. 1. For each new application level registration message, a s-CSCF is associated with the subscriber profile which has been fetched in response to the application level registration message. With each new application level registration message, the previous s-CSCF is deactivated. This is identified by "De-Register ( . . . , ALSI, . . . )" in FIG. 2. The transmission of the subscriber profile to the s-CSCF of the visited network for storage therein provides the s-CSCF with the subscriber profile which is used for a comparison of the level or type of service to be provided to the subscriber and the stored subscriber profile in order to control access of the subscriber to the network which may either be granted or denied depending upon whether the comparison yields that the level or type of access does not exceed the stored level or type of access contained in the subscriber profile. As illustrated, step "6" shows the authorization of the subscriber equipment in order to have connectivity which is identified in step 6 by "200 ok" which is a standard SIP designation for a granted authorization.

FIG. 3, as discussed above, is analogous to FIG. 2 except that the s-CSCF is resident in the home network 10 and a p-CSCF is resident in the visited network through which the communications involving the application level registration message are routed between the UE and the HSS 20 of the home network 10. As a result of the p-CSCF being resident in the visited network 12, additional messages "[SIP]CSCF assignment" identified as "5" and "[SIP]CSCF Assignment Ack" identified as "6" are required but otherwise the communications are identical to FIG. 2. Messages 5 and 6 are used by the HSS 20 to assign a s-CSCF in the home network and download the subscriber profile to the s-CSCF.

Figure 4:
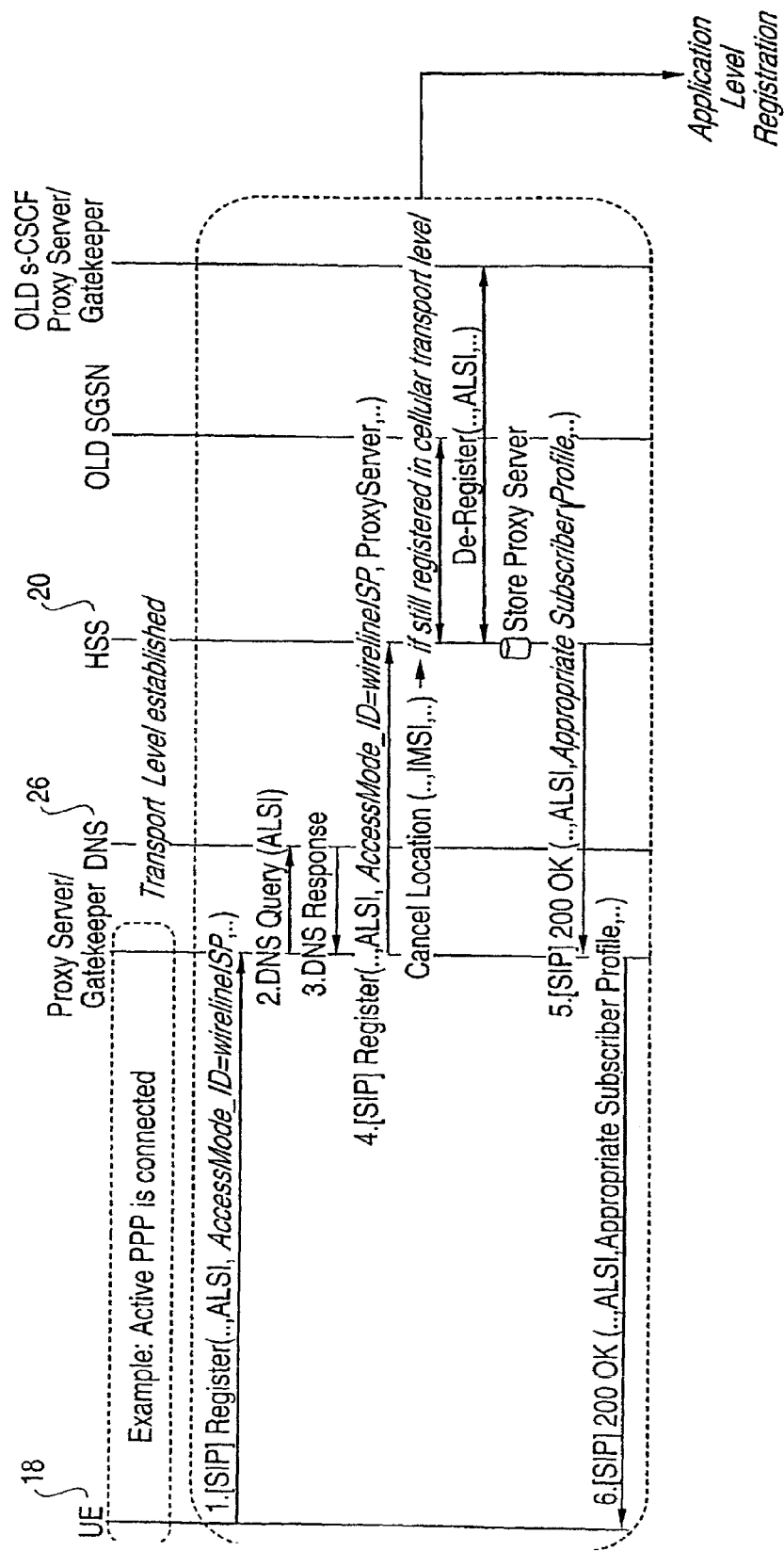
FIG. 4 illustrates connectivity of a subscriber through subscriber equipment through a wireline ISP to a home network in accordance with the present invention.

FIG. 4 illustrates the sequence of communications for the wireline ISP 14 with the transport level registration process, which is well known, having been established. The communications "1"-"6" are in accordance with FIG. 1 except that the deregistration process between the HSS and an old SGSN and an old one of a s-CSCF/Proxy Server/Gatekeeper are illustrated involving previous application level registration messages. The communications "1"-"6" are analogous to the communications of FIGS. 2 and 3 with the exception that the proxy server is the entity in the wireline ISP 14 through which the application level registration message communications are routed and further which stores the fetched subscriber profile.

Figure 5:
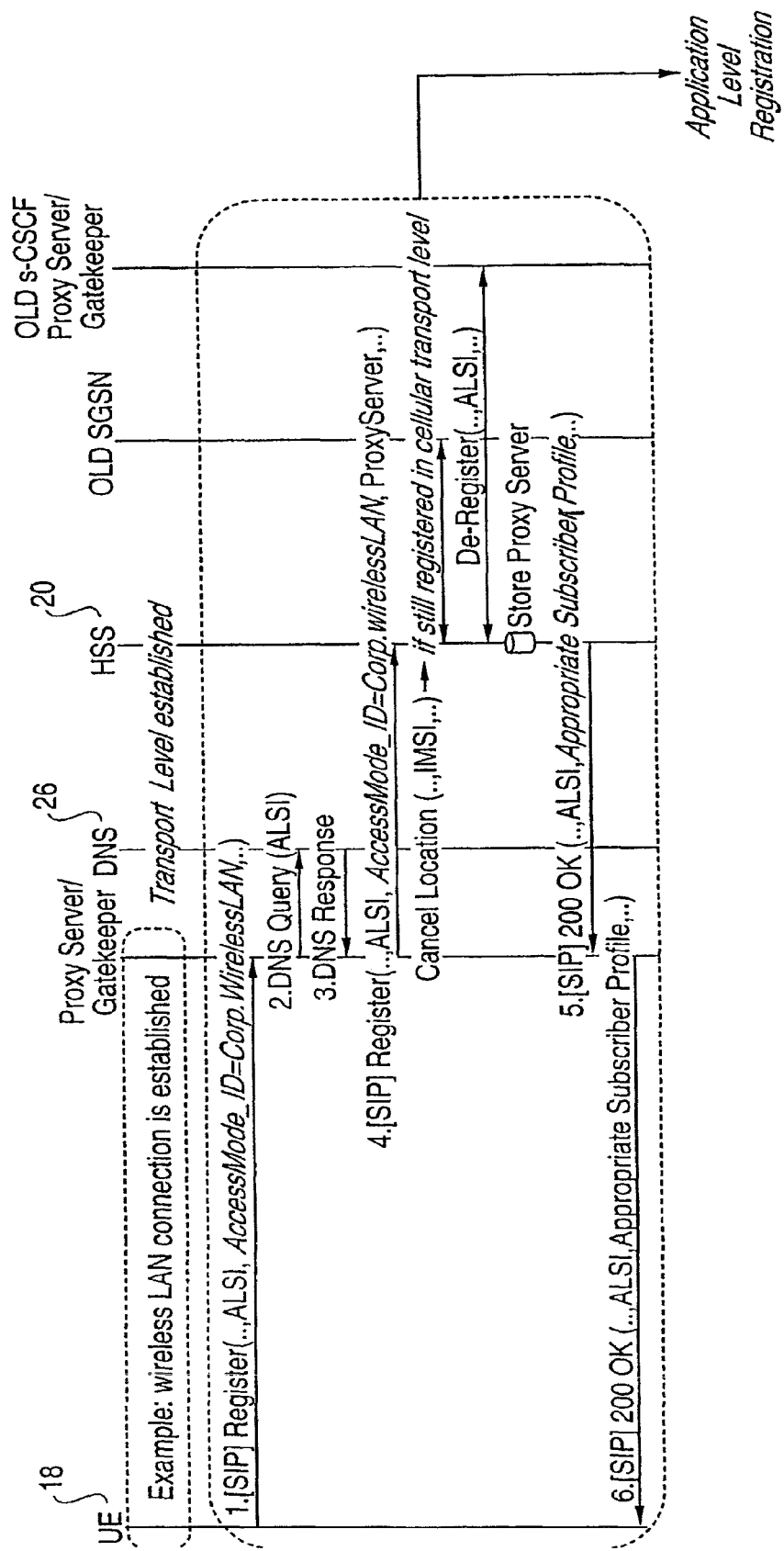
FIG. 5 illustrates connectivity of a subscriber through subscriber equipment through a wireless LAN to a home network in accordance with the present invention.

FIG. 5 illustrates the sequence of communications between the corporate wireless LAN 16 and the home network 10. The transport level registration process, which is well known, is established. The communications "1"-"6" are in accordance with FIG. 1 except that the deregistration process between the HSS and an old SGSN and an old one of a s-CSCF/Proxy Server/Gatekeeper are illustrated involving previous application level registration messages.

Figure 6:
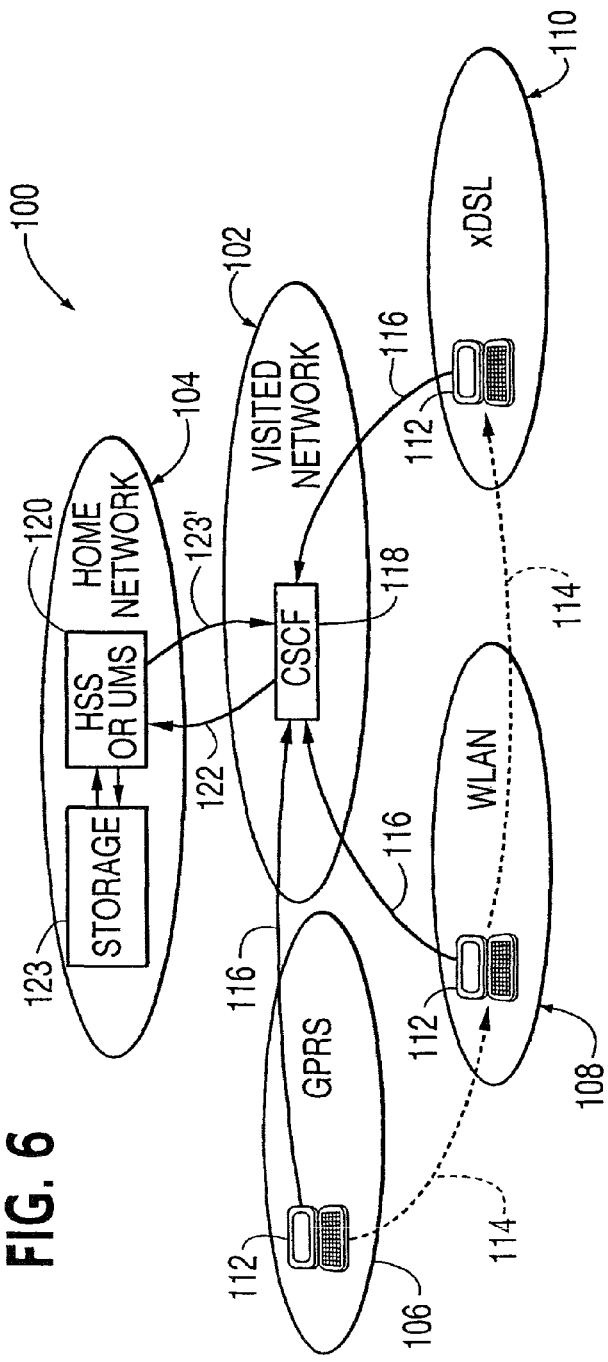
FIG. 6 illustrates a second embodiment of a plurality of networks connected to a home network through a visited network in accordance with the present invention.

FIG. 6 illustrates a second embodiment 100 of a plurality of networks connected through a visited network 102 to a home network 104. The plurality of networks may be access type networks which, without limitation, may be as illustrated a GPRS network 106, a wireless local area network (WLAN) 108, or a DSL network 110. The embodiment 100 is different than the embodiment 9 of FIG. 1 in that subscriber equipment 112 is registered in the access networks 106, 108 and 110 by connection through the visited network 102 to the home network 104 which performs the same functions generally as the home network 10 of FIG. 1. The subscriber's roaming between registration in the access networks 106, 108 and 110 is indicated by dotted line 114. In the embodiment 100, the subscriber equipment 112 generates a transport level registration message which is known and an application level registration message 116 which is communicated to the CSCF entity 118 of visited network 102. The application level registration message 116 provides at least an identification of the subscriber and in two embodiments as discussed below, a level or type of access which is transmitted to the CSCF entity 118 and then to an HSS or UMS entity 120 of home network 104. The CSCF 118 transmits a message, e.g. a SIP register message 122 to the HSS or UMS 120 of the home network 104. The update location message 122 informs the HSS or UMS 120 of the subscriber equipment identification and particular access network 106, 108 or 110 at which the subscriber equipment 112 is registered so as to permit the home network 104 to route communications through the visited network 102 to the particular access network 106, 108 or 110 in which the subscriber is registered. In addition to the updating of the location of the subscriber equipment 112 in two embodiments described below, an access type indicator (ATI) is transmitted from the CSCF entity 118 to the HSS or UMS 120 which identifies the type of access network at which the subscriber is registered. The content of the ATI permits the HSS or UMS to control connectivity through the visited network 102 for communications which are to terminate in one of the access networks 106, 108 and 110, such as, for example, based upon a subscriber profile stored in storage 123, which is analogous to the relationship between the HSS 20 and the storage 28 of the home network 10 of the embodiment 9 of FIG. 1. The HSS or UMS 120 transmits, at least in response to the first registration message from one of the access type networks 106, 108 and 110, a subscriber profile to be used by the CSCF entity 118 in controlling of connectivity communications to the subscriber equipment 112. The subscriber profile may be all subscriber data, which is not organized into any specific access network specific information, that is conveyed to the CSCF entity 118 or, alternatively, the subscriber profile may be general service data which pertains to aspects of the subscriber which are not particular to the access type networks 106, 108 and 110 and access specific information which pertains to service aspects of the subscriber which are particular to the access specific networks in which the subscriber equipment 112 roams. The general subscriber information and the access specific information are referred to as "a master profile" hereinbelow.

Upon registration of the subscriber with one of the access networks 106, 108 and 110, it is necessary to inform at least the CSCF entity 118 and in two embodiments discussed below the HSS or UMS 120 of the type of the access network in which the subscriber is registered.

The methodology of informing the CSCF entity 118 of the type of access type network 106, 108, 110 to which the subscriber is registered may be explicit or implicit. The first manner of generating an explicit ATI is where the terminal 112 provides the ATI to the CSCF entity 118. Another explicit manner of generating the ATI is from a network element providing an interface for the CSCF in that access network between the subscriber equipment 112 and the access type 106, 108 and 110 which transmits the ATI to the CSCF entity 118. Finally, the CSCF entity 118 may implicitly determine from the received communications, the type or identity of the ATI network, such as by the source address or route of the packets coming from the access network. Each time a terminal roams between one access type network to another access type network as indicated by arrow 114, it is necessary, as described above, for the CSCF entity 118 to determine the type of network in which the terminal 112 is currently registered.

Figure 7:
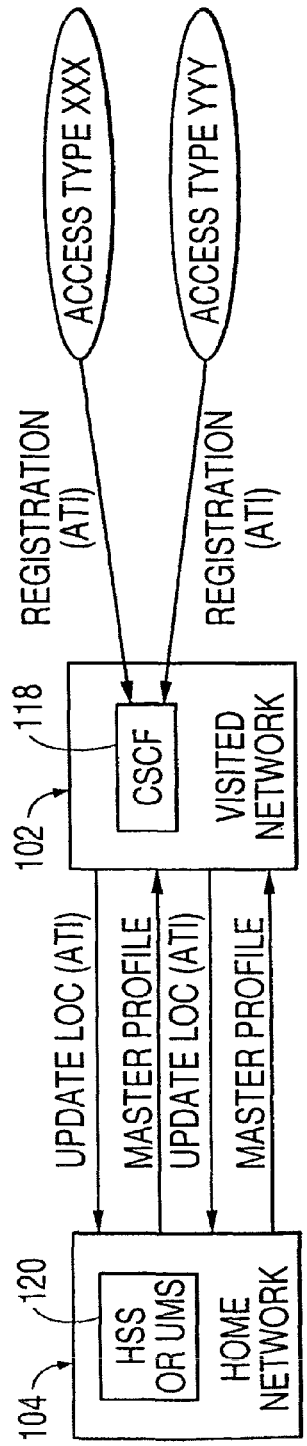
FIG. 7 illustrates a first methodology of generation and transferring of subscriber profile information with the embodiment of FIG. 6.

FIG. 7 illustrates a first methodology 140 in which the ATI is generated by one of the access type networks which are denominated as "XXX" and "YYY". The ATI is communicated to the CSCF entity 118 which is transmitted along with the update location information to the HSS or UMS 120 which conveys the subscriber equipment identification. The ATI includes an identification of the type of network at which the subscriber equipment 112 is registered. While not illustrated in FIG. 7, storage 123 in the home network 104 is accessed to obtain the subscriber profile which is retrieved based upon the identification of the subscriber and the nature of the access type network to which the subscriber is registered. This information is transmitted as a master profile to the CSCF entity 118 which functions as the call controlling entity in a known manner to permit or deny termination of communications to the subscriber equipment 112 based upon the subscriber profile and the capability of the current access type network to provide the required type of connectivity.

For example, the subscriber profile may permit communications to be terminated to the subscriber equipment 112 at one of the access type networks but, at the time at which termination is desired, the operational characteristics of the access type network may require refusal, all of which is performed by the CSCF entity 118 based upon having the master profile in its possession. Each time the terminal 112 roams, as indicated by arrow 114, a new registration message 116 is generated which is transmitted from the access type network to the CSCF entity 118 which causes a new update location message including the ATI to be sent to the HSS or UMS 120 of the home network 104. Thereafter, the master profile is transmitted from the HSS or UMS 120 to the CSCF entity 118. This process will occur each time a new registration occurs produced by roaming between the access type networks 106, 108 and 110.

FIG. 8 illustrates a second methodology 150 by which the subscriber information is processed. The communications are identical to the methodology 140 of FIG. 7 except that, in this circumstance, an acknowledgment 123' is sent from the HSS or the UMS 120 to the CSCF 118 after the first registration has occurred as a consequence of the subscriber profile already being stored in the CSCF entity 118. This enhances network efficiency.

FIG. 9 illustrates a third methodology 160 by which the subscriber information is processed. The procedure 160 of FIG. 9 differs from the procedures 140 and 150 respectively of FIGS. 7 and 8 in that the ATI is only transmitted to the CSCF entity 118. Only the update location information is transmitted from the CSCF entity 118 to the HSS or UMS 120 followed by the transmission of the master profile back to the CSCF as performed in the procedures 140 and 150. The difference is that, as a consequence of the HSS or UMS 120 not knowing the ATI, the home network 104 cannot perform any call termination functions which can result in the overall network being less efficient in that a communication which is not suited for termination at the subscriber device 112 in a particular access type network will be transmitted to the visited network 102 where the CSCF entity 118 performs the function of denying termination of the communication in the appropriate circumstance either because the subscriber's profile does not permit such a termination to occur or even if the subscriber profile does permit the termination to occur, the functionality of the access type network at the time that the communication is sought to be terminated does not permit the termination to occur.

If the CSCF entity 118 determines the ATI implicitly instead of with an explicit message as described above in the procedures 140, 150 and 160, the same processes are performed thereafter after the ATI indicating the type of access network at which the subscriber equipment 112 is registered is implicitly determined.

The embodiment of FIGS. 6-9 permits adaption of the network which includes a home network 102 and a visited network 104 to provide an available set of services to access type networks 106-110 in which a subscriber is registered. This permits such functions as call screening at the access network at which the subscriber terminal 112 is registered to be performed to deny connection thereto based upon any number of factors which may include quality of service (QoS).

In addition to when access network changes occur, at which time the HSS sends the subscriber information to the CSCF, the subscriber information may be requested at other times from the HSS by the CSCF.

While the invention has been described in terms of its preferred embodiments, it should be understood that numerous modifications may be made thereto without departing from the spirit and scope of the appended claims. It is intended that all such modifications fall within the scope of the appended claims.

The invention claimed is:

1. A method comprising:
   transmitting, to a visited network by a user equipment, a first message, where the first message comprises an identification of the user equipment and a request for an application level of service to be provided to the subscriber from the visited network which is one of a plurality of networks connected to a home network, the request being received by the home network from the visited network, wherein at the home network a predetermined subscriber profile is stored including the identification of the user equipment and an application level of access to be provided to the user equipment in any of the plurality of networks or the home network, wherein at least the location of the home network is determined by the visited network based on analysis of data transmitted to the visited network from the user equipment using packet data protocol; and
   in response to transmitting the first message, receiving, at the user equipment, access of the user equipment to the visited network dependent upon a comparison of the request for an application level of service to be provided to the user equipment in the plurality of networks or the home network and the stored predetermined subscriber profile, wherein the predetermined subscriber profile is selected from of a plurality of subscriber profiles for a subscriber based at least in part on a location of the user equipment, each subscriber profile of the plurality of subscriber profiles including a different level of access defining at least one of a bandwidth degree, a security degree or supported supplementary services, and wherein the access provided to the subscriber is application level access used to provide connectivity of the subscriber in the visited network defined by the selected subscriber profile.

2. The method in accordance with claim 1 wherein the application level of access authorizes a specific degree of bandwidth in communications.

3. The method in accordance with claim 1 wherein the application level of access authorizes a specific degree of security in communications.

4. The method in accordance with claim 1 wherein the application level of access authorizes specific connection of supplementary services.

5. The method in accordance with claim 1 wherein transmitting the first message is performed in response to the user equipment being connected to the visited network.

6. An apparatus comprising at least one hardware processor; and at least one non-transitory memory including computer program code, the at least one memory and the computer program code configured to, with the at least one processor, cause the apparatus to perform at least the following:
   to transmit, to a visited network, a first message, where the first message comprises an identification of the apparatus and a request for an application level of service to be provided to the apparatus from the visited network which is one of a plurality of networks connected to a home network, the request being received by the home network from the visited network, wherein at the home network a predetermined subscriber profile is stored including the identification of the apparatus and an application level of access to be provided to the apparatus in any of the plurality of networks or the home network, wherein at least the location of the home network is determined by the visited network based on analysis of data transmitted to the visited network from the user equipment using packet data protocol; and
   in response to transmitting the first message, receiving at the apparatus, access of the apparatus to the visited network dependent upon a comparison of the request for an application level of service to be provided to the apparatus in the plurality of networks or the home network and the stored predetermined subscriber profile, wherein the predetermined subscriber profile is selected from of a plurality of subscriber profiles for a subscriber based at least in part on a location of the user equipment, each subscriber profile of the plurality of subscriber profiles including a different level of access defining at least one of a bandwidth degree, a security degree or supported supplementary services, and wherein the access provided to the subscriber is application level access used to provide connectivity of the subscriber in the visited network defined by the selected subscriber profile.

7. The apparatus in accordance with claim 6 wherein the application level of access authorizes a specific degree of bandwidth in communications.

8. The apparatus in accordance with claim 6 wherein the application level of access authorizes a specific degree of security in communications.

9. The apparatus in accordance with claim 6 wherein the application level of access authorizes specific connection of supplementary services.

10. The apparatus in accordance with claim 6 wherein, when transmitting, the at least one memory and the computer program code are further configured to cause the apparatus to transmit the first message in response to a user equipment being connected to the visited network.

11. A computer program product comprising a non-transitory computer-readable storage medium bearing computer program code embodied therein for use with a computer, the computer program code comprising:
   code for transmitting by an apparatus, to a visited network, a first message, where the first message comprises an identification of the apparatus and a request for an application level of service to be provided to the apparatus from the visited network which is one of a plurality of networks connected to a home network, the request being received by the home network from the visited network, wherein at the home network a predetermined subscriber profile is stored including the identification of the apparatus and an application level of access to be provided to the apparatus in any of the plurality of networks or the home network, wherein at least the location of the home network is determined by the visited network based on analysis of data transmitted to the visited network from the user equipment using packet data protocol; and
   code for, in response to transmitting the first message, receiving at the apparatus, access of the apparatus to the visited network dependent upon a comparison of the request for an application level of service to be provided to the apparatus in the plurality of networks or the home network and the stored predetermined subscriber profile, wherein the predetermined subscriber profile is selected from of a plurality of subscriber profiles for a subscriber based at least in part on a location of the user equipment, each subscriber profile of the plurality of subscriber profiles including a different level of access defining at least one of a bandwidth degree, a security degree or supported supplementary services, and wherein the access provided to the subscriber is application level access used to provide connectivity of the subscriber in the visited network defined by the selected subscriber profile.

12. The computer program product in accordance with claim 11, wherein the application level of access authorizes a specific degree of bandwidth in communications.

13. The computer program product in accordance with claim 11, wherein the application level of access authorizes a specific degree of security in communications.

14. The computer program product in accordance with claim 11, wherein the application level of access authorizes specific connection of supplementary services.

* * * * *